Aug. 18, 1953  F. W. MAURER ET AL  2,649,395
FILTER MANUFACTURE
Original Filed Dec. 30, 1946
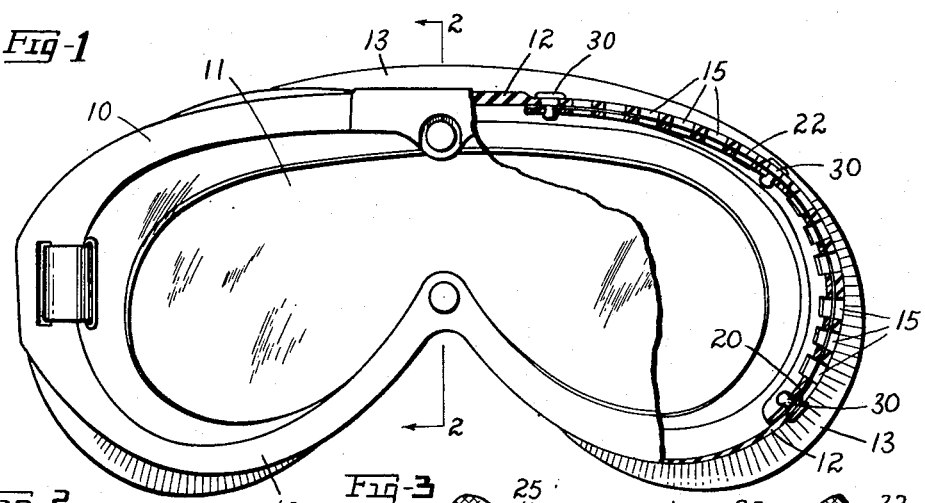
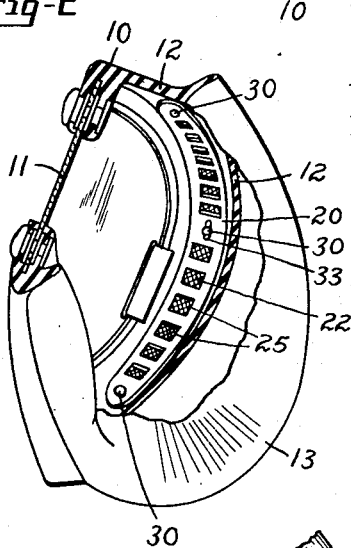
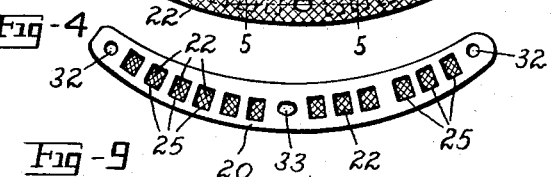
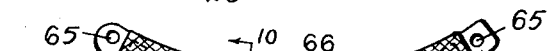
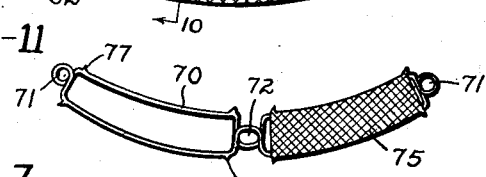
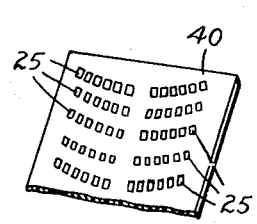
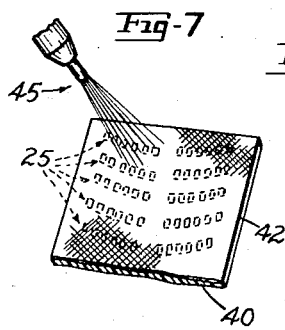
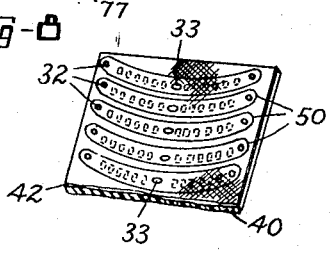
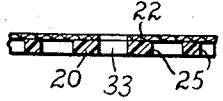
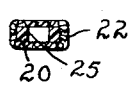
INVENTORS
Frank W. Maurer and
Jack B. Hirschman
BY
Marechal & Biebel
ATTORNEYS Patented Aug. 18, 1953

2,649,395

UNITED STATES PATENT OFFICE 2,649,395

FILTER MANUFACTURE

Frank W. Maurer, Newton Highlands, and Jack B. Hirschmann, Fairhaven, Mass., assignors, by mesne assignments, to Jack B. Hirschmann Original application December 30, 1946, Serial No. 719,326, now Patent No. 2,573,722, dated November 6, 1951. Divided and this application October 24, 1950, Serial No. 191,760

3 Claims. (Cl. 154—125)

This invention relates to a filter particularly adapted for uses such as in a goggle or similar device to filter and diffuse the air or other gas entering the eye chamber or other enclosure.

One of the principal objects of the invention is to provide such a filter which is simple and inexpensive to produce and which is so constructed that it may be quickly and easily removed or replaced whenever desired, as for example when it becomes clogged with dust or other foreign matter.

Another object is to provide such a filter which includes a layer of filter material secured to a perforated and flexible supporting member of sufficient stiffness to permit ready handling and ready attachment in position for use without injury either to the filter itself or to the goggle or other device wherewith it is used.

It is also an object of the invention to provide such a filter which can be readily and cheaply produced in quantity with the cloth or other filter material bonded to the supporting member to form a complete unit ready for attachment in position for use and which is formed for cooperation with attaching members permanently mounted on the goggle or other device wherewith the filter is to be used.

A further object is to provide a method of producing a filter of the above characteristics which is simple and inexpensive and which is particularly adapted for mass production of such filters at low unit cost.

Other objects and advantages of the invention will be apparent from the following description, the accompanying drawing and the appended claims.

In the drawing, in which like characters of reference designate like parts throughout—

Fig. 1 is a view in front elevation illustrating a filter constructed in accordance with the invention and mounted in a goggle, the view being partly broken away substantially on the center line of the filter to illustrate details of internal construction;

Fig. 2 is a view in vertical section taken on the line 2—2 of Fig. 1 and with portions of the goggle broken away for greater clarity;

Fig. 3 is a detail view in elevation of one side of a filter unit constructed in accordance with the invention;

Fig. 4 is an elevational view of the opposite side of the filter unit shown in Fig. 3;

Fig. 5 is an enlarged fragmentary sectional view taken substantially on the line 5—5 of Fig. 3;

Figs. 6, 7 and 8 are somewhat diagrammatic views in perspective illustrating steps in the production of the filter unit shown in Figs. 3–5;

Fig. 9 is a view similar to Fig. 3 showing another filter unit constructed in accordance with the invention;

Fig. 10 is an enlarged sectional view taken on the line 10—10 of Fig. 9; and

Fig. 11 is a view similar to Fig. 9 showing still another filter unit constructed in accordance with the invention.

The present invention provides filters for ventilation purposes which can be used until they become clogged or otherwise ineffective and can then be quickly replaced with a fresh filter. These filters are accordingly of such characteristics that they can be made very readily in quantity at low unit cost and hence can be economically thrown away after they become ineffective. The invention provides such filters as complete units, including both a layer of filter material such as cloth and a supporting member of sufficient combined rigidity and resiliency to support the filter material in efficient filtering relation with the port or ports with which it is used. This supporting member and the filter material are secured together, and the supporting member includes means by which the combined unit may be mounted directly in position for use with the supporting member thus serving as a part of the mounting means for the filter unit. In some embodiments of the invention, the filter material and supporting member are permanently secured together and in other such embodiments the filter material is readily removable from the supporting member to permit its replacement by fresh filter material. In either case, the filters of the invention are well adapted for uses where periodic replacement is necessary, as for example in such devices as goggles, masks, respirators or the like.

Referring to the drawing, which illustrates preferred embodiments of the present invention, Figs. 1 and 2 show filters constructed in accordance with the invention and mounted for use in a goggle comprising a one-piece rubber frame which includes a rim portion 10 adapted to receive and hold the periphery of a one-piece lens 11 formed of a suitable transparent plastic material such as cellulose acetate. A portion 12 of this frame extends rearwardly from the rim portion 10 to an integral flange portion 13 adapted to engage the face of a wearer, the frame and lens thus cooperating to form an eye chamber as best shown in Fig. 2.

In order to provide for ventilation of this eye chamber, the frame portion 12 has a multiplicity of openings 15 formed therein and extending around a considerable portion of the periphery of the frame to serve as ventilation ports as illustrated in Figs. 1 and 2, these openings or ports 15 being shown as generally rectangular in outline. The present invention is concerned with the provision of a filter which can be used to prevent the entry of dust particles or like foreign matter into the eye chamber through the ventilation ports while at the same time permitting adequate flow of air or other gas therethrough for proper ventilation of the eye chamber. Also, the invention is directed to the provision of such a filter which can be simply and easily replaced when it becomes clogged with dust or otherwise inefficient, and which can therefore be produced cheaply and thrown away after use.

Figs. 3-5 illustrate in detail a filter constructed in accordance with the invention and fulfilling the above requirements, and Figs. 1 and 2 illustrate the mounting of such a filter in the goggle. As shown, this filter includes an elongated and somewhat crescent-shaped strip of flexible material of such form as to fit within the goggle frame and to overlie the inner surface of the frame portion 12, as shown in Figs. 1 and 2. This strip 20 in turn has a layer 22 of filter material such as cloth overlying one surface thereof and adhered thereto to form a complete unit. Satisfactory results have been obtained utilizing cellulose acetate for the filter-supporting member 20, this material having adequate stiffness in relatively thin layers to hold its shape but at the same time being sufficiently flexible to permit ready deformation for proper fit within goggle frame. The layer 22 of filter material may comprise any cloth of sufficient thickness and sufficiently close weave to retain undesired particles of dust or the like while still permitting ready passage of air therethrough, satisfactory material for this purpose being cloth of the type of a felt or flannel.

As shown in the drawing, the filter-supporting member 20 is formed with a multiplicity of spaced apertures 25 therethrough of the same number and relative spacing as the ports 15 in the goggle frame portion 12, but the cloth layer 22 completely overlies one surface of this supporting member 20 except for the mounting holes 32 and 33, and thereby serves to filter air or gas traversing the apertures 25. With this construction, when the filter unit is mounted within the goggle in the manner shown in Figs. 1 and 2, the cloth layer 22 will be held between the plastic layer 20 and the inner surface of the frame portion 12, and with the apertures 25 in the plastic layer in properly registering relation with the ports 15 in the frame, the cloth 22 will thus filter all air or other gas entering the eye chamber as clearly shown in Fig. 1.

Figs. 1 and 2 also illustrate means for removably securing the filter unit in position within the goggle. As shown, the frame portion 12 has a number of male fastening members or studs 30 mounted therein and projecting inwardly. For example, these members 30 may comprise male fastener members of the well known "dot" type. The filter unit is in turn provided with holes punched completely through both the plastic and the cloth to cooperate with these male fasteners. As shown, there are three such fasteners at each side of the goggle, and each filter unit is accordingly provided with three holes to cooperate with the fasteners, the two holes 32 at either end of the filter being substantially circular but the intermediate hole 33 being a slot extending generally parallel to the length of the filter.

With this construction, when the filter is mounted in a goggle as shown in Figs. 1 and 2, the holes 32 and 33 provide the female portions of the fastener units, and the studs 30 snap into these holes to secure the filter in place. The studs 30 in the end holes 32 anchor the filter in position, and since the plastic layer 20 is bowed as shown in order to conform with the curve of frame portion 12, these end connections retain the plastic under stress tending to urge it outwardly and thereby to press the filter layer 22 firmly against the frame to prevent leakage of dust around the filter. At the same time, the slot 33 permits relative adjusting movement between the plastic layer 22 and the frame in use, particularly such adjusting as is necessary for comfortable fit of the goggle on the face of the wearer. When it is desired to remove or replace the filter, this may be done quickly and easily by simply unsnapping the fastener studs from holes 32 and 33, and a new filter may be mounted in position with equal ease.

The filter units of the present invention are readily made by mass production methods at low unit cost, and Figs. 6-8 illustrate steps in the method of producing these filters. Referring to Fig. 6, a quantity of filters may be made simultaneously starting with a sheet 40 of suitable material for the supporting layer of the filter. This sheet may comprise any of a variety of materials of adequate stiffness and resiliency in layers sufficiently thin for use as described, suitable materials including plastics such as cellulose acetate or other cellulose esters, or thin sheets of spring metal. The first step in the method of the invention is to cut out in sheet 40 a plurality of groups of apertures 25 arranged and spaced in accordance with the arrangement and spacing of the ventilation ports with which they are to register in use, which can readily be done by a simple die-cutting operation, with all the apertures 25 for all the filter units to be formed from the same sheet 40 being cut at the same time, as shown in Fig. 6.

In the next step of the method, a sheet 42 of the desired cloth or other filter material is superimposed on one surface of the plastic sheet, as shown in Fig. 7, and caused to adhere to the plastic. This may be done very readily by applying to the filter layer 42 a coating of adhesive material and then applying the cloth layer thereto. For example, in the case of cellulose acetate, the adhesive may comprise a solution of cellulose acetate in a solvent such as acetone or a mixture of acetone and methyl Cellosolve. If such an adhesive, in a relatively fluid condition, is applied to the sheet 40 with a brush or roller, it will coat the solid areas of the sheet but leave the apertures 25 open, so that when the cloth layer is superimposed on sheet 40, it will be bonded to the solid areas of the sheet but there will be no effect on the portions of the cloth overlying these apertures 25, which will remain clear for the proper transmission of gas therethrough. The final step of this method is to cut out the individual filter units 50 from the composite sheet 40—42, as shown in Fig. 8. This also may be done by a simple die-cutting operation, and the die may also be formed to cut the holes 32 and slots 33 in the units at the same time.

Fig. 7 also illustrates another method of carrying out the adhesion between layers 40 and 42, which can be carried out when its supporting layer 40 is a plastic. With the filter layer 42 superimposed on layer 40, a volatile solvent for the plastic is applied to the filter layer, as indicated at 45 in Fig. 7, a suitable solvent being acetone in the case of cellulose acetate. The solvent will penetrate the filter layer 42 and soften the adjacent surface of the plastic layer sufficiently to cause an intimate bonding between the two layers, no pressure being required during this operation other than the mere weight of the filter layer itself. Then when the solvent has evaporated, which takes place rapidly, the two layers will be formed to be intimately bonded together.

Figs. 9 and 10 illustrate a filter unit similar to that shown in Figs. 3–5 but of somewhat different construction. In this filter, the supporting member 60 is substantially the same as member 20 in Figs. 3–5, but the filter material 62 is in the form of a tube of suitable cloth into which the member 60 is inserted. This tube 62 may be of substantially the same length as member 60, in which case it can have holes therethrough to match the mounting holes 65 in member 60, or it can be of sufficiently lesser length, as shown, to leave exposed the ends of member 60 and the holes 65. Similarly the tube 62 may have slots 66 cut therethrough matching the corresponding slot in member 60, or it may be made in two parts as in the filter shown in Fig. 11.

Referring to Fig. 11, in this filter the supporting member 70 is formed of wire, bent to approximately the same outline as members 20 and 60 and including loops 71 and 72 which form the female mounting members. The filter material is formed of two tubes 75 each sufficiently less than half as long as member 70 to leave exposed the loops 71 and 72, one of these tubes being removed in Fig. 11 to show the form of member 70. Member 70 may also be formed, as shown, with barbs 77 adapted to catch on the filter tubes and thus aid in securing them to member 70. With either of the filters shown in Figs. 9–11, when the filter material becomes clogged or otherwise ineffective, the unit may be snapped out of place and the tube or tubes removed from the supporting member and replaced by a fresh tube or tubes. This operation can be carried out substantially as quickly as the replacement of the filters shown in Figs. 3–5 and has the advantage that the supporting members can be reused, thus further reducing expense.

It will accordingly be seen that the present invention provides filters which are efficient in use as well as simple to install or replace. The invention also provides a method by which these filters may be rapidly and easily made from relatively inexpensive material, and even utilizing successfully materials which would otherwise be suitable only for scrap. For example, in the formation of cellulose acetate sheeting by the conventional baby cake method, the two or three sheets formed from the material adjacent the outer surface of the cake usually have a somewhat frosted appearance and hence are unsuitable for optical use or other uses wherein transparency is desired. However, such frosted sheets are perfectly satisfactory for the purposes of the present invention.

Since the filters of the invention can thus be produced at low unit cost, it is practical to use them only once and then to replace and discard them after they have become clogged or otherwise lost their efficiency. They are useful not only in goggles of the type shown in the drawing but also have particular application in goggles of the type shown in Patent No. 2,387,522, assigned to the same assignee as this application, wherein the gas inhaled by the wearer passes through the eye chamber to prevent fogging of the lens. They may also be used successfully as ventilation filters for other devices such, for example as masks and respirators, such use requiring only proper shape and arrangement of the holes in accordance with the particular design of the device wherewith the filters are to be used.

This application is a division of our application Serial No. 719,326 filed December 30, 1946, now Patent No. 2,573,722 issued November 6, 1951.

While the method herein described constitutes a preferred embodiment of the invention, it is to be understood that the invention is not limited to this precise method, and that changes may be made therein without departing from the scope of the invention which is defined in the appended claims.

What is claimed is:

1. In a method of producing a filter of the character described including a layer of filter material and a perforate flexible supporting member for said filter material, the steps of forming in a sheet of organic plastic material a plurality of apertures, superimposing a filter cloth on one surface of said apertured plastic sheet, and saturating said cloth with a volatile solvent for said plastic while said cloth and said plastic sheet are in intimate contact to soften the surface of said plastic sheet adjacent said cloth with resultant intimate bonding between the adjacent surfaces of said sheet and said cloth while maintaining the areas of said cloth overlying said apertures free of said plastic for proper transmission of gas therethrough.

2. In a method of producing multiple filters of the character described each including a layer of filter material and a perforate flexible supporting member for said filter material, the steps of forming in a sheet of organic plastic material a series of groups of apertures, superimposing a filter cloth on one surface of said apertured plastic sheet, saturating said cloth with a volatile solvent for said plastic while said cloth and said plastic sheet are in intimate contact to soften the surface of said plastic sheet adjacent said cloth with resultant intimate bonding between the adjacent surfaces of said sheet and said cloth while maintaining the areas of said cloth overlying said apertures free of said plastic for proper transmission of gas therethrough, and then cutting the resulting composite sheet of cloth and plastic into individual filter units.

3. In a method of producing multiple filters of the character described for use in an enclosure having male attaching members for supporting the filter in position to filter and diffuse gases entering said enclosure, the steps of forming in a sheet of organic plastic material a series of groups of apertures, applying to one surface of said apertured plastic sheet a filter cloth and a volatile solvent for said plastic with said cloth in overlying gas-transmitting relation with said apertures, maintaining said cloth in superimposed relation with said surface while said solvent evaporates to cause said surface to soften and to adhere intimately to the adjacent surface of said cloth with substantially no effect on the areas of said cloth overlying said apertures and thereby leaving said apertures free of said plastic for proper transmission of gas therethrough, and thereafter cutting the resulting composite sheet of cloth and plastic into individual filter units and also forming holes in each such filter unit through both said cloth and said plastic sheet for cooperation with said male attaching members.

FRANK W. MAURER.
JACK B. HIRSCHMANN.

References Cited in the file of this patent

UNITED STATES PATENTS

| Number | Name | Date |
| --- | --- | --- |
| 1,970,755 | Knoll | Aug. 21, 1934 |
| 1,999,283 | Clemens | Apr. 30, 1935 |
| 2,389,435 | Karlstrom | Nov. 20, 1945 |